United States Patent
Zlotnick

(10) Patent No.: US 7,111,255 B2
(45) Date of Patent: Sep. 19, 2006

(54) TIME-BASED EVALUATION OF DATA VERIFICATION RESULTS

(75) Inventor: Aviad Zlotnick, D.N. Galil Takhton (IL)

(73) Assignee: International Business Machines Corporation, Armonk, NY (US)

(*) Notice: Subject to any disclaimer, the term of this patent is extended or adjusted under 35 U.S.C. 154(b) by 604 days.

(21) Appl. No.: 09/887,086

(22) Filed: Jun. 25, 2001

(65) Prior Publication Data

US 2002/0196290 A1   Dec. 26, 2002

(51) Int. Cl.
G06F 3/00 (2006.01)
G06F 9/00 (2006.01)
G06F 17/00 (2006.01)
G06K 9/03 (2006.01)

(52) U.S. Cl. ..................... 715/866; 382/311

(58) Field of Classification Search ........... 345/835, 345/157; 382/229, 311; 707/4; 343/158; 235/492; 377/16; 359/630; 455/3.05; 715/866
See application file for complete search history.

(56) References Cited

U.S. PATENT DOCUMENTS

| | | | |
|---|---|---|---|
| 4,256,953 A * | 3/1981 | Allen | 377/16 |
| 5,455,875 A | 10/1995 | Chevion et al. | |
| 5,933,531 A * | 8/1999 | Lorie | 382/229 |
| 5,982,555 A * | 11/1999 | Melville et al. | 359/630 |
| 6,081,629 A * | 6/2000 | Browning | 382/313 |
| 6,181,339 B1 * | 1/2001 | deCarmo et al. | 345/835 |
| 6,281,879 B1 * | 8/2001 | Graham | 345/157 |
| 6,295,387 B1 * | 9/2001 | Burch | 382/311 |
| 6,454,173 B1 * | 9/2002 | Graves | 235/492 |
| 6,470,336 B1 * | 10/2002 | Matsukawa et al. | 707/4 |
| 6,473,752 B1 * | 10/2002 | Fleming, III | 707/4 |
| 6,563,532 B1 * | 5/2003 | Strub et al. | 348/158 |
| 6,600,899 B1 * | 7/2003 | Radomsky et al. | 455/3.05 |
| 6,735,574 B1 * | 5/2004 | Bull | 705/32 |

* cited by examiner

Primary Examiner—Kristine Kincaid
Assistant Examiner—Boris Pesin
(74) Attorney, Agent, or Firm—Browdy and Neimarks, PLLC

(57) ABSTRACT

The present invention is directed to a system and method for evaluating verification of data by an operator. The data is presented to the operator on a computer-controlled display and a time duration is measured over which the operator interacts with the display in verifying the presented data. The time duration is indicative of the reliability of the verification of the data by the operator.

30 Claims, 3 Drawing Sheets

TIME-BASED EVALUATION OF DATA VERIFICATION RESULTS

FIELD OF THE INVENTION

The present invention relates generally to data encoding and specifically to methods and apparatus for improving the accuracy of data input to a computer.

BACKGROUND OF THE INVENTION

There are many applications for data input from a hard copy to a computer system that use automated Optical Character Recognition (OCR), followed by manual verification of the OCR results. Often, the computer that performs the OCR also generates a confidence rating for its reading of each character or group of characters. Human operators perform the verification step, either by reviewing all the fields in the original document, and correcting errors and rejects discovered in the OCR results, or by viewing and correcting only the characters or fields that have a low OCR confidence level.

There are methods known in the art for improving the reliability of the verification step. For example, U.S. Pat. No. 5,455,875, to Chevion et al., whose disclosure is incorporated herein by reference, describes a method for organizing data on a computer screen so as to improve productivity of human operators in verifying OCR results. The method is implemented in document processing systems produced by IBM Corporation (Armonk, N.Y.), in which the method is referred to as "SmartKey."

SmartKey works by presenting to the human operator a "carpet" of character images on the screen of a verification terminal. The character images are taken by segmenting the original document images that were processed by OCR. Segmented characters from multiple documents are sorted according to the codes assigned to them by the OCR. The character images are then grouped and presented in the carpet according to their assigned code. Thus, for example, the operator might be presented with a carpet of characters that the OCR has identified as representing the letter "a." Under these conditions, it is relatively easy for the operator to visually identify OCR errors, such as a handwritten "o" that was erroneously identified as an "a." The operator marks erroneous characters by clicking on them with a mouse.

The displaying of composite, "carpet" images to the operator, made up entirely of characters which have been recognized by the OCR logic as being of the same type, enables errors to be rapidly recognized and marked on an exception basis. Once recognized, these errors can then be corrected either immediately or sent to another operator for correction, along with characters rejected by the OCR logic. The remaining, unmarked characters in the carpet are considered to have been verified.

Even in productivity-enhancing verification systems, such as SmartKey, there are still cases in which the operator may be uncertain about whether to verify a given OCR reading. This may be the case particularly in verifying hand-written characters. The operator is supposed to pass only unambiguous characters in the verification stage, while marking all erroneous or even ambiguous characters as incorrect (or at least uncertain). However, when the character is ambiguous, the operator may attempt to guess whether a certain reading is correct, thus reducing the reliability even of the verified results. There is therefore a need to improve the quality and reliability of the verification step of such data input methods.

SUMMARY OF THE INVENTION

Preferred embodiments of the present invention provide methods and systems for improving the reliability of verification of coding of information, particularly coding of characters in documents by OCR.

In preferred embodiments of the present invention, a system for verifying data coding recognizes instances in which an operator is likely to have guessed in verifying a code. Such instances are typically characterized by the operator having taken significantly more time to verify the "guessed" item than he normally takes to verify a known item. The method comprises measuring the time taken for the operator to verify an item, such as a character or group of characters, relative to the operator's average time for performing this verification. A group of characters in this case might typically be a SmartKey carpet, i.e., a screen filled with characters. In cases where the time significantly exceeds the average, the character or group of characters is marked as suspect. The character may then be re-verified by the same or by another operator. The system may be set up so as to define a maximum time, either fixed for all operators or adjusted dynamically, so that an operator is not allowed to spend more than a certain factor times the operator's average time before the character or group of characters is declared ambiguous by the system.

By the same token, if the operator verifies a character or group of characters too rapidly, it is likely that he or she has paid too little attention to the characters before verifying them. Therefore, in some preferred embodiments of the present invention, a minimum time limit is set, and the character or group of characters are declared ambiguous if the operator has taken less than this minimum amount of time to verify them.

In some preferred embodiments of the present invention, the operator is allowed to re-verify the suspect item. This sometimes involves overriding the previous input with a new input. Alternatively, a screen containing the suspect item is passed on to another operator. In some cases of verifying characters, such as in SmartKey, there are two stages of verification. The first stage comprises examining a large number of characters on a screen and the second stage comprises verifying or correcting characters one at a time. Thus, in the first stage, if an operator takes too long to process a character or a screen, the entire screen may be passed on to another operator. In the second stage, only the character that took a long time to process may be marked as suspect and marked for reprocessing. Alternative arrangements will be apparent to those skilled in the art, depending on the specific workflow pattern of a given verification system.

There is thus provided in accordance with a preferred embodiment of the present invention, a method for evaluating verification of data by an operator, including:

presenting the data to the operator on a computer-controlled display, measuring a time duration over which the operator interacts with the display in verifying the presented data, and evaluating the verification of the data by the operator responsive to the time duration.

Preferably, presenting the data includes displaying characters from a document to which codes have been assigned so that the operator can verify that the assigned codes are correct. Further preferably, displaying the characters includes displaying results of optical character recognition (OCR) processing. Most preferably, displaying the results includes displaying together a plurality of characters which have been assigned the same code by the OCR processing. Alternatively, displaying the characters includes presenting characters in the form of a word.

In a preferred embodiment, measuring the time duration over which the operator interacts with the display includes measuring the time taken by the operator to verify an entire screen of the data. Alternatively, measuring the time duration over which the operator interacts with the display includes measuring an interaction with a particular item on a screen of the data. Alternatively or additionally, measuring the interaction with the particular item on the screen includes monitoring use of a pointing device by the operator.

In a further preferred embodiment, evaluating the verification of the data includes assigning a confidence level to the data responsive to the time duration. Preferably, assigning the confidence level includes lowering the confidence level as the time duration increases. Most preferably, the method further includes effecting a corrective action responsive to the low confidence level. Typically, effecting the corrective action includes presenting the data to a second operator.

Alternatively, evaluating the verification of the data includes rejecting the verification of the data when the time duration exceeds a predetermined limit. Preferably, rejecting the verification includes passing the data to another operator for verification. Further alternatively, evaluating the verification of the data includes rejecting the verification of the data when the time duration is less than a predetermined limit In a preferred embodiment, measuring the time duration includes calculating an average time duration for the operator to process a given quantity of the data, and comparing the time duration to the average. Optionally, measuring the time duration over which the operator interacts with the display includes measuring movement of an eye of the operator in viewing the display.

There is also provided in accordance with another preferred embodiment of the present invention, data verification apparatus, including:

an interactive display, configured to present data for verification to an operator, an input device coupled to the interactive display so as to enable the operator to verify the presented data by interaction with the display, and a processor arranged to measure a time duration during which the operator interacts with the display in verifying the presented data, and to evaluate the verification of the data by the operator responsive to the time duration.

Preferably, the data include characters from a document to which a code has been assigned, presented so that the operator can verify that the assigned code is correct. Most preferably, the codes are determined by optical character recognition (OCR) processing of the characters.

In a preferred embodiment, the apparatus includes an eye tracking device, adapted to measure movement of an eye of the operator in viewing the display, wherein the processor is coupled to receive an input from the eye tracking device for use in evaluating the verification of the data.

There is further provided in accordance with another preferred embodiment of the present invention, a computer software product for evaluating verification of data by an operator, the product including a computer-readable medium in which program instructions are stored, which instructions, when read by a computer, cause the computer to present the data to the operator on a computer-controlled display, to measure a time duration over which the operator interacts with the display in verifying the presented data, and to evaluate the verification of the data by the operator responsive to the time duration.

The present invention will be more fully understood from the following detailed description of the preferred embodiments thereof, taken together with the drawings, in which:

DETAILED DESCRIPTION OF PREFERRED EMBODIMENTS

Figure 1:
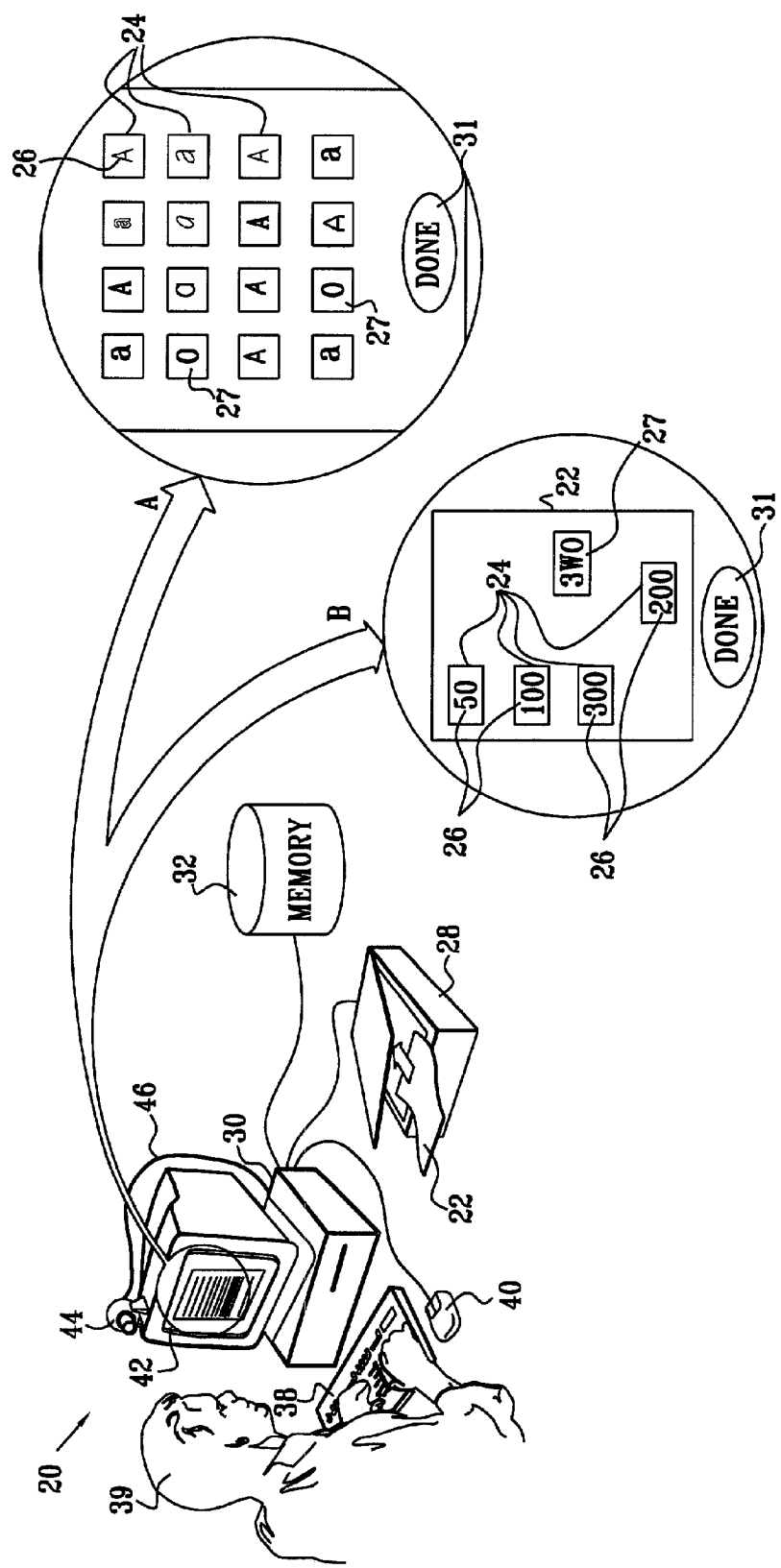
FIG. 1 is a simplified pictorial illustration showing a system for verification of coding of information, in accordance with a preferred embodiment of the present invention.

FIG. 1 is a simplified pictorial illustration showing a system 20 for verification of coding of information, in accordance with a preferred embodiment of the present invention. System 20 receives a document 22 for extraction of information therefrom. The document preferably comprises a preprinted form having fields 24 that are filled in with handwritten, typed or printed contents 26. The contents typically comprise alphanumeric characters, although they may comprise symbols or marks of other types, generated by hand or by machine.

In order to extract information from document 22, system 20 performs OCR on an image of the document, and thus assigns a code (such as an ASCII code) to each character. A scanner 28 first captures an image of document 22 and conveys the corresponding image data to a document processor 30, typically comprising a suitable general-purpose computer. Alternatively, the document is input to the processor from another source, typically in electronic form, either as a document image or as characters keyed in by an operator. Further alternatively, although the methods described hereinbelow are applied specifically to verification of OCR characters, the principles of these methods are applicable to verification of data coding of substantially any type.

The OCR and verification functions of processor 30 (typically together with other document processing functions) are preferably performed using software running on processor 30. The software may be supplied on tangible media, such as diskettes or CD-ROM, and loaded into the processor. Alternatively, the software may be downloaded to the processor via a network connection or other electronic link. Further alternatively, processor 30 may comprises dedicated, hard-wired elements or a digital signal processor designed to carry out some or all of the processing steps.

Typically, processor 30 retrieves items from memory 32 and presents them on a screen 42 for verification by an operator 39. An item may be an alphanumeric character, a symbol or any other object requiring verification. More typically, the items are characters all having the same code, and requiring operator verification, as in the IBM SmartKey system, described in the Background of the Invention. Processor 30 typically allows the operator to process a screen full of items or characters for a preset time. Processor 30 measures the time taken for each operator to verify each screen.

Operator 39 views multiple items simultaneously on screen 42, and identifies any anomalous item appearing on the screen. In the example of FIG. 1, as shown in the inset at upper right, the operator views a SmartKey "carpet" of characters 26, all of which were coded by processor 30 (or by another processor or operator) as representing the letter "A". The carpet is also seen to include a number of anomalous characters 27, which were evidently miscoded. The operator typically marks anomalous items 27 by clicking a mouse 40 on these items. As is exemplified in FIG. 1, inset A, the operator has to identify and mark anomalous letters "o" that appear in the carpet of "A"s. As soon as he has done this, he clicks mouse 40 on a "done" button 31. This is indicative that the screen has been verified by operator 39. Alternatively, the operator may press an enter button on a keyboard 38. At this point the screen is considered to have been verified, with the exception of the marked anomalous items 27. The anomalous items are sent for further processing.

Alternatively, as shown in the lower inset B, operator 39 may be required to verify and/or correct fields 24 comprising numerical characters 26 on a screen of numerical characters. The letter W in the string "3W0" stands out as being an anomalous item 27. In this case, the operator has to identify, mark and possibly correct anomalous item 27 "3W0" and then click mouse 40 on the "done" button so as to show that all items on screen designated B have been verified, with the exception of "3W0".

Processor 30 typically measures the time taken for the operator to verify a screen full of items relative to the operator's average time for performing the verification of such a screen. In cases where the time taken to verify the screen full of items significantly exceeds the operator's average time for doing this, processor 30 marks the screen full of items as suspect. A confidence level assigned to the screen full of items or characters is typically reduced by processor 30 and stored in memory 32. Alternatively or additionally, processor 30 may simply remove the contents of screen 42 after a predetermined time limit has expired. The suspect screen full of items may then be automatically passed on to another operator for verification. The system may be set up so as to define a maximum time, either fixed for all operators, or adjusted dynamically for individual operators, so that any operator is not allowed to spend more than a certain amount of time (such as a certain number times his average time per screen) before the screen full of items is declared suspect or ambiguous by system 20.

Preferably, system 20 tracks the movement of mouse 40, so as to measure the time during which the mouse causes the cursor to dwell on any particular character or word. When the cursor remains over an item for an abnormally long time, it is often indicative that the operator is unsure of the item or guessing at its verification. The dwell time of the cursor may thus be used to determine the particular item in a given screen about which the operator is uncertain, so that the confidence level of this item can be reduced accordingly, possibly without reducing the confidence level of the entire screen.

System 20 optionally comprises an eye tracking device 44, which is connected through a connection 46 to processor 30. The eye tracking device is typically a video camera which can focus on operator 39 and track his eye movements. When the operator focuses on one item for a time significantly longer than his average, this is normally indicative of the operator being unsure of the item or guessing at the item. System 20 then registers the item as being suspect, as described hereinabove.

Figure 2A:
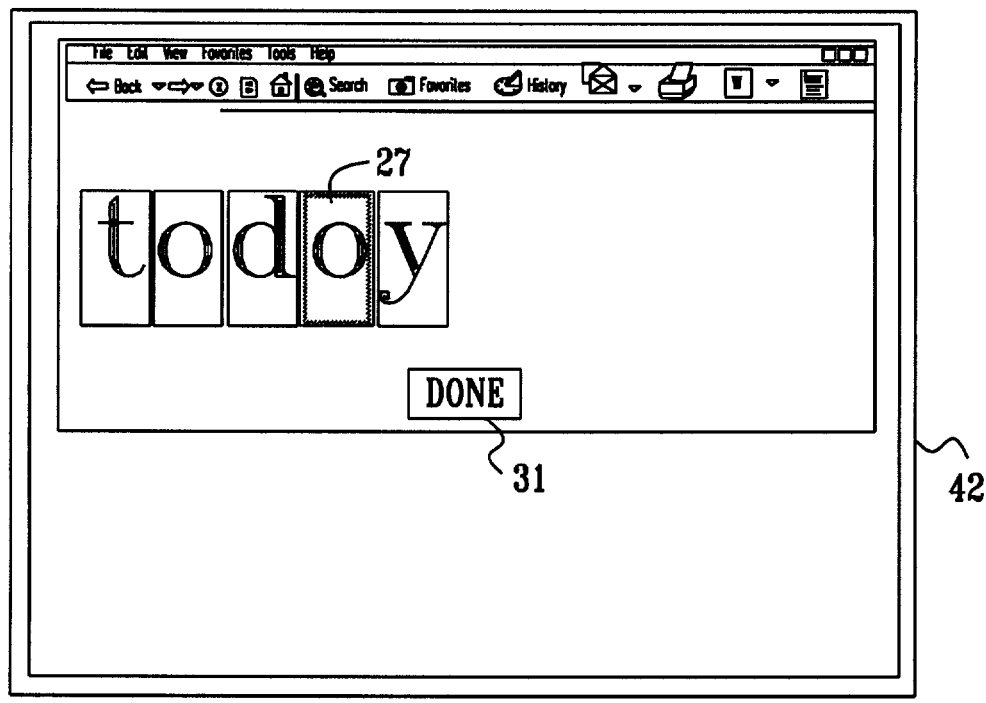
FIGS. 2A and 2B are simplified pictorial illustrations showing details of a methodology for verification of coding of information, in accordance with a preferred embodiment of the present invention.
Figure 2B:
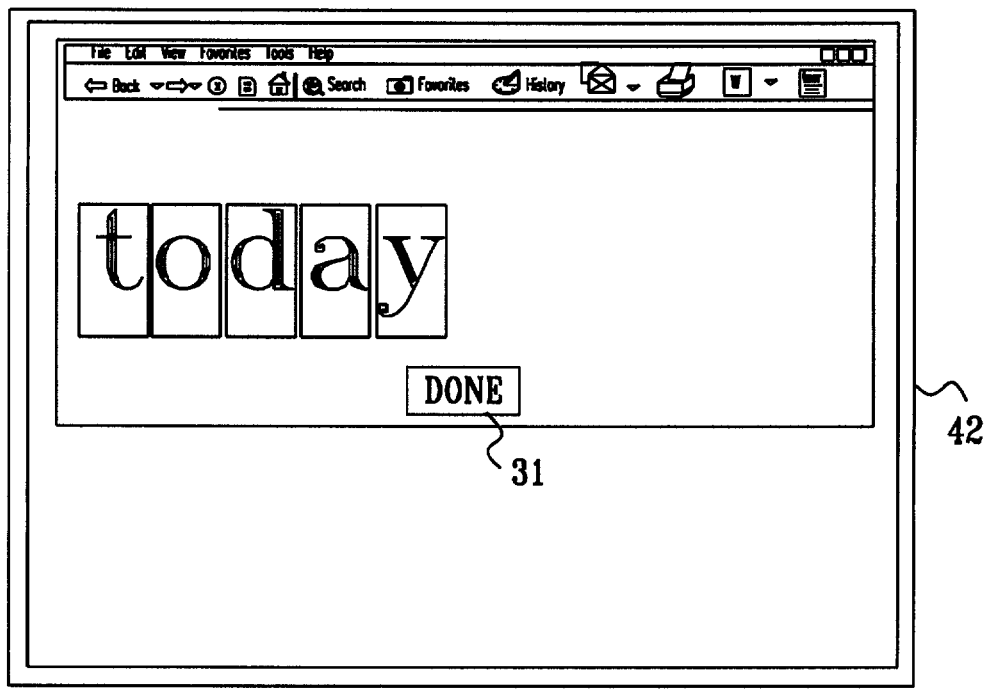

Reference is now made to FIGS. 2A and 2B, which are simplified pictorial illustrations showing details of a methodology for verification of coding of information, in accordance with another preferred embodiment of the present invention. If any entry 26 in any of fields 24, such as anomalous items 27 shown in FIG. 1, is declared ambiguous or is marked as suspect by the operator, processor 30 retrieves the context of item 27 from memory 32. It may then be presented to either the same or a different operator on screen 42 in the context of a string of characters, such as a word, that contained the anomalous character in the original document. For example, the "o" shown in the first screen in FIG. 1 now appears in its original context in FIG. 2A in the word "todoy". Typically, the segment of the original text image from which the string was taken is also displayed alongside the coded characters, but this segment is omitted from the figures here for the sake of simplicity.

In the embodiment of FIGS. 2A and 2B, the operator is required to re-verify the suspect character "o" or to change it to its correct code. After clicking on the "o" with mouse 40, the operator is allowed to override the "o" with a new keyed-in input, such as the letter "a", so that the word reads "today". The operator typically keys-in the new character on keyboard 38, or alternatively uses mouse 40 to copy, paste, or delete, as is required. The operator then clicks mouse 40 on "done" button 31. If the operator does not change any of the characters in the word in question, the word is considered to have been verified "as is."

Processor 30 evaluates such verification or correction of data by the operator by assigning a confidence level as a function of a length of the time duration taken for the operator to verify or process one or more characters. Typically, if the time duration is increased, processor 30 lowers the confidence level. In some cases, processor 30 rejects an operator input if the time duration exceeds a preset maximum. This may include deletion of one or more operator-inputted characters. Additionally or alternatively, the processor reduces the confidence level of the verification results if the operator has clicked on a given character repeatedly, which may indicate ambivalence about the character in question. Further additionally or alternatively, processor 30 may enable the operator to update the input of at least one character, or may present the at least one character to a second operator.

Figure 3:
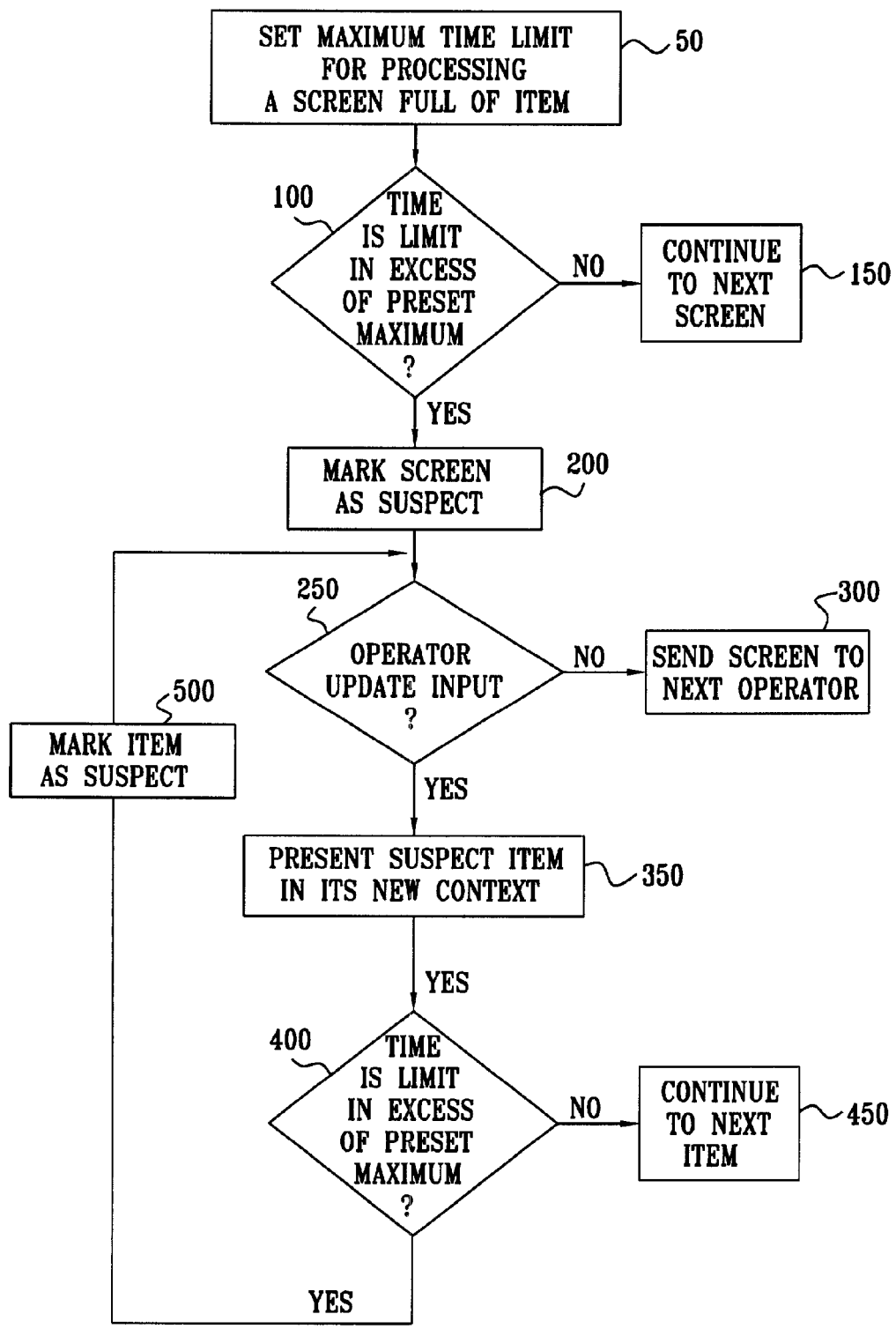
FIG. 3 is a simplified flow chart showing a method for verifying coding of characters, in accordance with a preferred embodiment of the present invention.

FIG. 3 is a simplified flow chart showing a method for verifying coding of characters, in accordance with a preferred embodiment of the present invention.

The method of FIG. 3 begins with an initialization step 50, in which system 20 of FIG. 1 recalls a preset time limit for a first operator to process a screen full of items or characters from memory 32. This may be an average time duration for all operators to process a screen full of items, or it may be a personalized average for the first operator, recalled from memory 32, or dynamically updated according to the performance of the first operator and calculated by processor 30. Processor 30 then presents a screen full of items, and measures the time duration for the first operator to process the screen, in a comparison step 100. This is typically a screen with multiple items, as is shown in FIG. 1. Alternatively, the steps of this method may be applied to a character or a character string, as is shown in FIGS. 2A and 2B. If the time taken for the first operator to process the screen is less than the preset limit, then the screen is considered to have been verified, and operator is allowed by system 20 to proceed to the next screen, as is shown in an authorization for continuation step 150.

If the first operator takes longer than the time limit to process the screen full of items, as is typical when the operator is hesitant, unsure or is guessing one or more items in the screen, then processor 30 marks the screen as suspect in a marking step 200. The processor may or may not allow the first operator to continue working on and updating the present screen, at an update step 250. The system may change the screen automatically if the time duration of the first operator for processing the screen full of items is too long, and present a new screen full of items to the operator. In this case, the data in the screen from the first operator must be passed on to one or more other operators for verification, in a pass-on step 300.

Alternatively, the first operator may be able to update the input, following decision step 250. The suspect screen full of items may be assigned a low confidence level, wherein the confidence level assigned is typically a descending function of the extra time taken.

By way of example, in a first stage in a Smartkey system, an operator examines a large number of items or characters on screen 42 (as is shown in FIG. 1), while the second stage comprises verifying items or characters one at a time (as is shown in FIGS. 2A and 2B). Thus, in the first stage, if an operator takes too long to process a screen, then the screen may be passed on to another operator at step 250. On the other hand, in the second stage, the screen containing the item which took a long time to process may simply be marked as suspect at step 200, and the operator is allowed to continue with the processing at step 250.

In the present example, processor 30 recalls the context of the anomalous item 27 and provides it in a string of items or characters, such as a word in a presenting step 350. The operator can normally more easily judge from the context of the string of items characters or word, whether item 27 should be verified or replaced. As is seen in FIGS. 2A and 2B, the second "o" in the item/character string "todoy" should be replaced with an "a" so as to read "today", as is shown in FIG. 2B. The operator marks and updates the "o" as is described in FIG. 2B hereinabove. Processor 30 measures the time taken by the operator to mark and update item 27 in a measuring step 400. If the time taken by the operator is less than the preset maximum for this specific operation, then the operator is allowed to continue to a new item in a continuation step 450. If he takes longer than the preset maximum for this operation, then the item is marked as suspect in a marking step 500, and its confidence level may be further reduced. The item may be rejected altogether, and the screen comprising the item may be passed on to another operator in step 300. The screen may be of the type of screen shown in FIG. 1 comprising a large number of items, or may be the screen of FIG. 2A comprising a string of items/characters, depending on how system 20 is set up.

Alternatively or additionally, the changes of one operator to his own input may be tracked using a "track changes" option, such as the option known in the art in standard word-processing packages. In some cases, the operator may make a typing error when inputting or updating a character, and correct it almost immediately by overriding the original input. System 20 may be set up to ignore such corrections, or may lower the confidence level of the newly inputted character.

In some cases, the suspect character marked in step 200, may be updated automatically by system 20, by using a relationship between two different fields 24 on a document 22. This may a geometric, mathematical or other relationship. For example, if an address comprises the name of the city "Stanford", then another field comprising the zip code may be utilized to define whether this is Stanford in Calif. or Stamford in Conn., and the "n" may be changed to "m" automatically.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method for evaluating verification of data by a human operator, comprising the steps of:
presenting the data to the operator on a computer-controlled display, wherein the data comprise characters from a document to which codes have been assigned by optical character recognition (OCR) processing, so that the operator can verify that the assigned codes are correct;
measuring a time duration over which the operator interacts with the display in verifying the presented data; and
evaluating the verification of the data by the operator so as to assign a confidence level to the data responsive to the time duration, wherein assigning the confidence level comprises lowering the confidence level as the time duration increases; and
effecting a corrective action responsive to a low confidence level.

2. The method according to claim 1, wherein displaying the results comprises displaying together a plurality of characters which have been assigned the same code by the OCR processing.

3. The method according to claim 1, wherein displaying the characters comprises presenting characters in the form of a word.

4. The method according to claim 1, wherein measuring a time duration over which the operator interacts with the display comprises measuring the time taken by the operator to verify an entire screen of the data.

5. The method according to claim 1, wherein measuring the time duration over which the operator interacts with the display comprises measuring an interaction with a particular item on a screen of the data.

6. The method according to claim 5, wherein measuring the interaction with the particular item on the screen comprises monitoring use of a pointing device by the operator.

7. The method according to claim 1, wherein effecting the corrective action comprises presenting the data to a second operator.

8. The method according to claim 1, wherein evaluating the verification of the data comprises rejecting the verification of the data when the time duration exceeds a predetermined limit.

9. The method according to claim 8, wherein rejecting the verification comprises passing the data to another operator for verification.

10. The method according to claim 1, wherein measuring the time duration comprises calculating an average time duration for the operator to process a given quantity of the data, and comparing the time duration to the average.

11. The method according to claim 1, wherein measuring the time duration over which the operator interacts with the display comprises measuring movement of an eye of the operator in viewing the display.

12. The method according to claim 1, wherein evaluating the verification of the data comprises rejecting the verification of the data when the time duration is less than a predetermined limit.

13. Data verification apparatus, comprising:
an interactive display, configured to present data for verification to a human operator;
an input device coupled to the interactive display so as to enable the operator to verify the presented data by interaction with the display, wherein the data comprise characters from a document to which codes have been assigned by optical character recognition (OCR) processing, presented so that the operator can verify that the assigned codes are correct; and
a processor arranged to measure a time duration during which the operator interacts with the display in verifying the presented data, and to evaluate the verification of the data by the operator so as to assign a confidence level to the data responsive to the time duration, wherein the confidence level is lowered as the time duration increases, and wherein the processor is arranged to effect a corrective action responsive to a low confidence level.

14. The apparatus according to claim 13, wherein the data presented for verification comprise a plurality of characters which have been classified by the OCR processing as having the same code.

15. The apparatus according to claim 13, wherein the processor is arranged to measure the time duration over which the operator interacts with the whole screen.

16. The apparatus according to claim 13, wherein the processor is arranged to measure the time duration over which the operator interacts with a particular item on the screen.

17. The apparatus according to claim 13, and further comprising an eye tracking device, adapted to measure movement of an eye of the operator in viewing the display, wherein the processor is coupled to receive an input from the eye tracking device for use in evaluating the verification of the data.

18. The computer software product for evaluating verification of data by a human operator, the product comprising a computer-readable medium in which program instructions are stored, which instructions, when read by a computer, cause the computer to present the data to the operator on a computer-controlled display, wherein the data comprise characters from a document to which codes have been assigned by optical character recognition (OCR) processing, so that the operator can verify that the assigned codes are correct, to measure a time duration over which the operator interacts with the display in verifying the presented data, and to evaluate the verification of the data by the operator so as to assign a confidence level to the data responsive to the time duration, wherein the confidence level is lowered as the time duration increases, and wherein the instructions cause the computer to effect a corrective action responsive to a low confidence level.

19. The product according to claim 18, wherein the instructions cause the computer to display together a plurality of characters which have been assigned the same code by the OCR processing.

20. The product according to claim 18, wherein the instructions cause the computer to present characters in the form of a word.

21. The product according to claim 18, wherein the instructions cause the computer to measure the time taken by the operator to verify an entire screen of the data.

22. The product according to claim 18, wherein the instructions cause the computer to measure a time duration of an interaction with a particular item on a screen of the data.

23. The product according to claim 22, wherein the instructions cause the computer to monitor use of a pointing device by the operator.

24. The product according to claim 18, wherein the instructions cause the computer to present the data to a second operator.

25. The product according to claim 18, wherein the instructions cause the computer to reject the verification of the data when the time duration exceeds a predetermined limit.

26. The product according to claim 25, and wherein the instructions cause the computer to pass the data to another operator for verification.

27. The product according to claim 18, wherein the instructions cause the computer to calculate an average time duration for the operator to process a given quantity of the data, and to compare the time duration to the average.

28. The product according to claim 18, wherein the instructions cause the computer to measure a time duration of a mouse cursor dwelling substantially on one item on the display by tracking the cursor by means of a tracking device, the tracking device connected electrically to the computer.

29. The product according to claim 18, wherein the instructions cause the computer to measure a time duration of a movement of an operator's eye by tracking the eye by means of a tracking device, the tracking device connected electrically to the computer.

30. The product according to claim 18, wherein the instructions cause the computer to reject the verification of the data when the time duration is less than a predetermined limit.

* * * * *